United States Patent [19]
Polzin et al.

[11] Patent Number: 6,052,794
[45] Date of Patent: Apr. 18, 2000

[54] UPGRADEABLE MICROPROCESSOR AND MOTHERBOARD

[75] Inventors: R. Stephen Polzin, Morgan Hill, Calif.; Richard Schuckle, Austin, Tex.

[73] Assignee: Advanced Micro Devices, Inc., Sunnyvale, Calif.

[21] Appl. No.: 09/111,815

[22] Filed: Jul. 8, 1998

[51] Int. Cl.[7] ....................................................... G06F 1/04
[52] U.S. Cl. .............................................. 713/500; 713/1
[58] Field of Search ...................... 713/500, 1; 710/8–10

[56] References Cited

U.S. PATENT DOCUMENTS

| | | | |
|---|---|---|---|
| 5,546,563 | 8/1996 | Chuang | 395/500.48 |
| 5,594,873 | 1/1997 | Garrett | 710/101 |
| 5,644,760 | 7/1997 | Polzin et al. | |
| 5,935,222 | 8/1999 | Knauer | 710/14 |
| 5,948,077 | 9/1999 | Choi et al. | 710/9 |

*Primary Examiner*—Thomas M. Heckler
*Attorney, Agent, or Firm*—Mikio Ishimaru

[57] ABSTRACT

A microprocessor card having a microprocessor is connected to a predetermined pattern of resistors for providing a binary notation signature identifying the speed capability of the microprocessor and for adjusting the speed of the clock signals for the microprocessor. A motherboard having circuitry for recognizing the binary notation signature identifying the speed capability of a microprocessor is connected to the predetermined pattern of resistors. A series of latches latch the microprocessor speed identification into a logic and lookup table circuitry. The table circuitry looks up a binary notation signature correlating the motherboard speed capability with the speed capability of the particular microprocessor. This binary notation signature, which identifies the motherboard speed in relationship to the microprocessor speed, provides the binary notation signature on the resistors and overrides the microprocessor speed identification. A series of latches latch the motherboard identification signature to multiplier circuitry to cause the multiplier circuitry to adjust the speed of clock signals to the microprocessor appropriately for the motherboard.

20 Claims, 2 Drawing Sheets

UPGRADEABLE MICROPROCESSOR AND MOTHERBOARD

TECHNICAL FIELD

The present invention relates to the field of computer systems and more particularly to upgrading computer systems.

BACKGROUND ART

To meet the growing demands of the personal computer (PC) consumer, personal computer manufacturers are constantly improving system performance in microprocessor speed and functionality, memory speed and size, power consumption, visual quality, and input/output performance. Manufacturers improve personal computers through technological advances in the processes used to fabricate the integrated circuit devices within the personal computer and/or through hardware or software design improvements. The personal computer manufacturers often strive to implement these technological or design advances into consumer available products as soon as possible in order to keep up with consumer demand and to compete with other computer manufacturers.

With the rapid advances in technology, a computer system can become obsolete in relatively short amount of time so consumers often desire to upgrade their current systems to obtain the processing advantages of more advanced systems in the most cost effective manner.

One way in which a consumer may upgrade their computer system is by replacing the motherboard. The motherboard of a computer system contains and interconnects the main microprocessor, a clock generation device, and other integrated devices and components that determine the functionality of the system. However, replacing the old motherboard as a unit tends to be a narrow upgrade path for the consumer since it is limited by the physical constraints of the computer housing in which the motherboard resides. As the size of personal computers are reduced, future motherboards have different shapes and sizes. Also, replacing the motherboard is relatively expensive and requires a certain degree of skill, so oftentimes is not a viable option to the consumer.

In addition, from the perspective of a computer manufacturer, redesigning motherboards is a time consuming process. It takes close to a year to design and test a new motherboard. During this time, new non-motherboard upgrades cannot be made available to the consumer and neither manufacturers nor consumers gain the benefits of the technological advances to microprocessors until the redesigned motherboard is ready.

The better ways of upgrading involve replacing the current microprocessor residing on the motherboard with a new, upgraded microprocessor. Redesigning a microprocessor is more cost and time effective than redesigning a complete motherboard. In general, the upgraded microprocessors are designed to be faster and more power efficient than their predecessors due to newly developed technologies and circuit designs.

Faster microprocessors require a faster clock. Since clocks are generally on the motherboard, replacement of the microprocessor requires modification of the clock signals from the motherboard. Generally, the original clock signal from the motherboard must be multiplied up to the faster rate required by the new microprocessor. The circuitry for increasing the rate of the motherboard clock is provided for in the microprocessor, but unfortunately, it can be tuned to increase the clock rate only for a given motherboard clock rate.

Another disadvantage of only replacing the microprocessor is that the new microprocessor is designed to upgrade only a particular motherboard design. This is because the microprocessor I/O bus is designed to have a communication protocol that is adaptable to only a particular motherboard design.

Another problem with replacing the microprocessor occurs where the personal computer manufacturers offer a family of computer systems with each system having different features. In order to provide these different features, each family member has a corresponding different motherboard design adapted to a particular microprocessor. Due to the different motherboard design, a microprocessor produced to upgrade one family member cannot be employed for upgrading another family member. For example, it might not be possible to upgrade the lower-end microprocessor in a family member with a higher-end microprocessor from the same family.

One solution to the clock problem on the motherboard is to fix the maximum motherboard clock speed and provide jumpers on the motherboard so the microprocessor clock speed can be changed manually when the microprocessor speed is known. Unfortunately, this requires a high degree of skill on the part of the consumer which leads to their often buying another computer rather than risk damage to the computer by working in its entrails.

Another solution to this problem is to develop a microprocessor daughter card that contains the microprocessor and a clock, and to remove the clock from the motherboard. The clock would be set up to provide clock signals appropriate to the motherboard and also be subject to the multiplier circuitry in the microprocessor to provide clock signals appropriate to the microprocessor. This is much easier on the consumer who wishes to upgrade.

The two drawbacks to this last solution are that the maximum speed capability of the motherboard must be known (and acts as a limit to upgrading motherboards) and that the multiplier circuitry must be preselected for each microprocessor daughter card depending on the maximum speed capability of the motherboard.

A system has been long sought which would allow upgrades merely by insertion of a new, faster microprocessor without prior knowledge of the motherboard in which the faster microprocessor would be inserted. This system has long eluded those skilled in the art.

Also, a system has long been sought which would allow an original equipment manufacturer (OEM) to design a motherboard in anticipation of a better microprocessor which is expected but is not yet available. The OEM would like to use up the inventory of existing microprocessors using the new motherboard and be able to switch over to the new microprocessor immediately when it becomes available.

DISCLOSURE OF INVENTION

The present invention provides a microprocessor card having a microprocessor connected to circuitry for providing a binary notation signature identifying the speed capability of the microprocessor and for adjusting the speed of the clock signals for the microprocessor.

The present invention provides a motherboard having circuitry for recognizing the binary notation signature identifying the speed capability of a microprocessor and providing a binary notation signature identifying the motherboard speed capability for the particular speed capability of the microprocessor and causing the speed of clock signals to the microprocessor to be adjusted appropriately.

An advantage of the present invention is to provide a microprocessor card which can be unchanged or upgraded when a motherboard is upgraded.

Another advantage of the present invention is to provide a motherboard which can be unchanged or upgraded when a microprocessor card is upgraded.

A further advantage of the present invention is to provide a system in which either the microprocessor card or the motherboard can be unchanged or upgraded when the other is upgraded.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
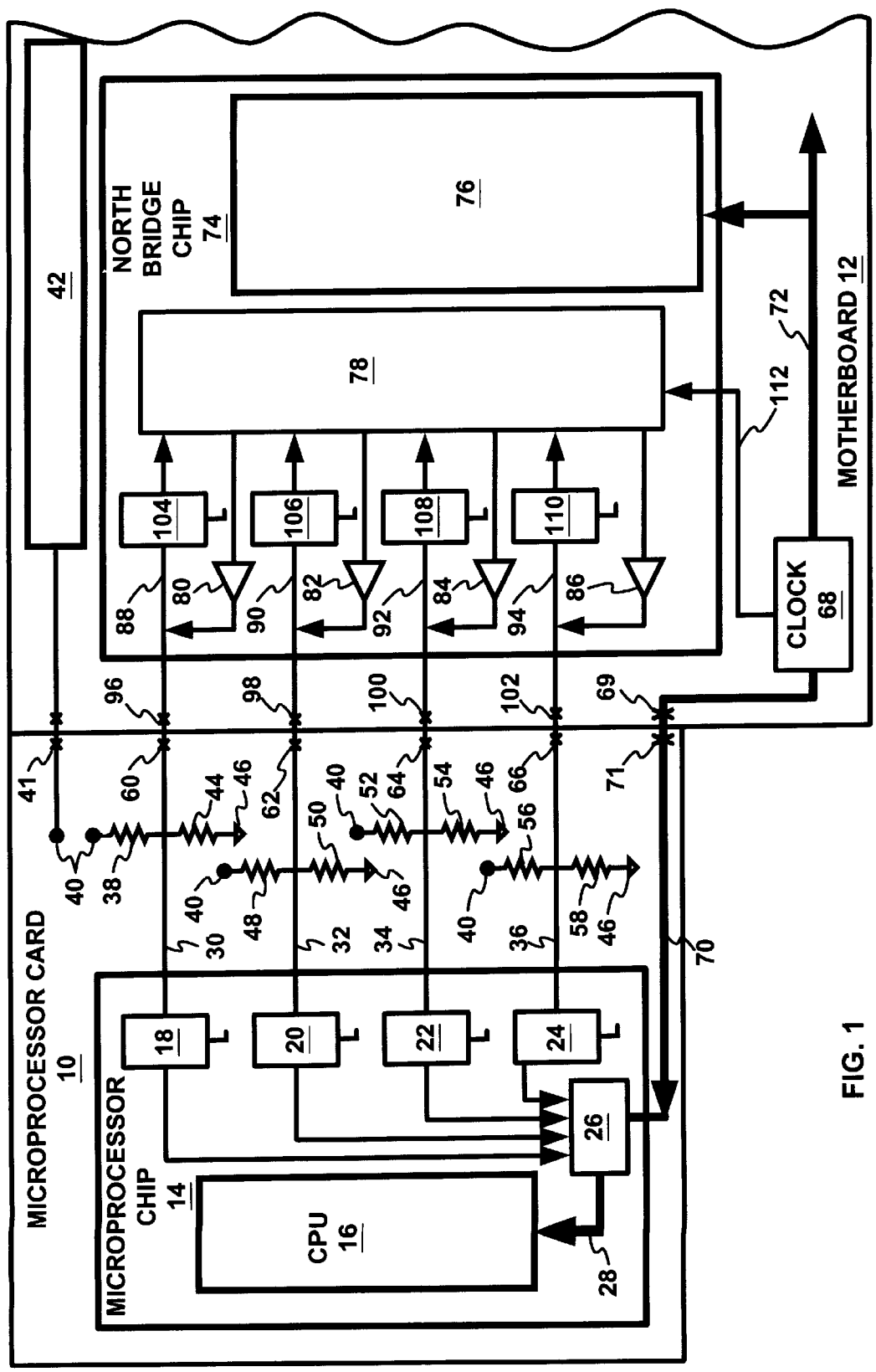
FIG. 1 is schematic of a microprocessor card and motherboard of the present invention.

Referring now to FIG. 1, therein is shown a schematic of a microprocessor card 10 and motherboard 12. On the microprocessor card 10 is the microprocessor integrated circuit semiconductor chip, or microprocessor chip 14, which contains the central processing unit, or CPU 16, and on the same silicon, a series of latches 18, 20, 22, and 24: each of the latches 18, 20, 22, and 24, which latch at reset, is connected to conventional frequency multiplier circuitry 26 which is connected by a microprocessor clock bus 28 to the CPU 16. Each of the latches 18, 20, 22, and 24 is connected to a lead 30, 32, 34, and 36, respectively.

Referring again to FIG. 1, it should be understood that the motherboard 12 is shown with all resistors shown even though only half the resistors are ever on a particular motherboard 12. The lead 30 is shown connected through a pullup resistor 38 to a voltage 40 from a connector 41 to a voltage supply 42. The lead 30 is also connected through a connector (not shown) and through a pulldown resistor 44 to a ground 46. As will later be explained, although both resistors 38 and 44 are shown, only one or the other will be in place in the actual microprocessor card 10. Similarly, the lead 32 is shown connected through a pullup resistor 48 to the voltage 40 and through a pulldown resistor 50 to the ground 46; the lead 34 is connected through a pullup resistor 52 to the voltage 40 and through a pulldown resistor 54 to the ground 46; and the lead 36 is connected through a pullup resistor 56 to the voltage 40 and through a pulldown resistor 58 to the ground 46. The leads 30, 32, 34, and 36 are also respectively connected to edge connectors 60, 62, 64, and 66 on the microprocessor card 10.

On the motherboard 12 is a clock 68 for outputting clock signals which drive the entire computer. The clock 68 is connected through connectors 69 and 71 to a microprocessor clock bus 70. The microprocessor clock bus 70 conducts clock signals to the multiplier circuitry 26 at the motherboard clock frequency. The multiplier circuitry 26 accepts a binary signal in and multiplies the motherboard clock frequency up to the clock frequency appropriate for the CPU 16.

The clock 68 is also connected by a motherboard clock bus 72 to the memory controller 76 and other computer support system chips on the motherboard 12. The computer support system logic components provide the various functions which together form a complete computer. One typical component of system logic on the motherboard 12 is a north bridge chip 74. The north bridge chip, so designated because it is normally drawn on the north side of a motherboard layout when looking at the layout as a map, is usually memory controller chip. The north bridge chip 74 is a typical memory controller chip with a memory controller 76 and some extra space into which conventional logic and lookup table circuitry 78 is placed. The logic and lookup table circuitry 78 is connected to a series of drivers 80, 82, 84, and 86.

The drivers 80, 82, 84, and 86 are connected by leads 88, 90, 92, and 94, respectively, to motherboard connectors 96, 98, 100, and 102, respectively. The motherboard connectors 96, 98, 100, and 102 engage with the edge connectors 60, 62, 64, and 66 on the microprocessor card 10 as shown in FIG. 1. The leads 88, 90, 92, and 94 are also connected to latches 104, 106, 108, and 110, which latch at reset. In turn, the latches 104, 106, 108, and 110 are connected to the logic and lookup table circuitry 78. Further, the logic and lookup table circuitry 78 is also connected to receive signals through a signal lead 112 from the clock 68.

Figure 2:
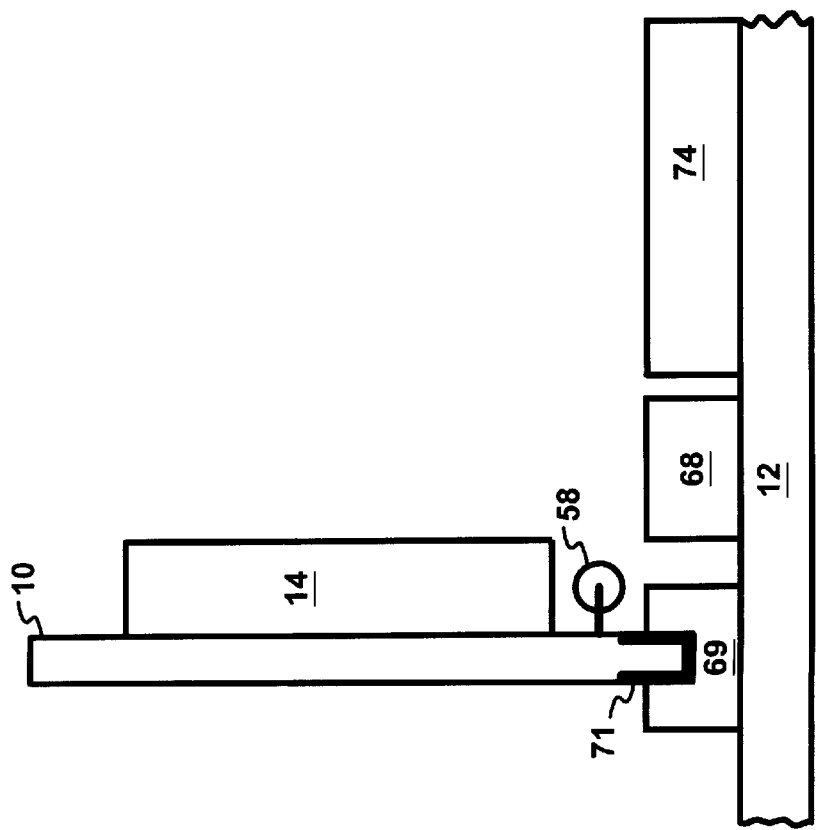
FIG. 2 is schematic side view of a microprocessor card and motherboard of the present invention.

Referring now to FIG. 2, therein is shown the side view of the microprocessor card 10 and the mother board 12. The north bridge 74 and the clock 68 are shown mounted on motherboard 12. The mother board connector 69 for the clock bus is shown with the microprocessor card edge connector 71 inserted therein. On the microprocessor card 10 are the resistor 58 and the microprocessor chip 14.

Figure 3:
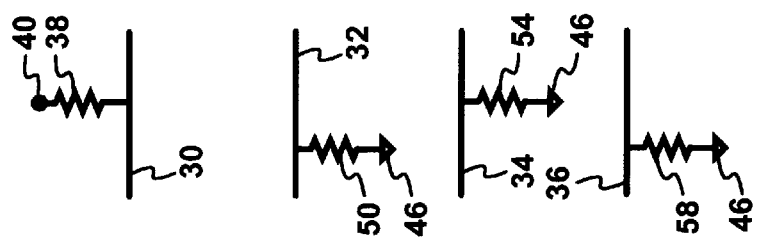
FIG. 3 is one pullup/pulldown resistor arrangement of the present invention.

Referring now to FIG. 3, therein are shown the leads 30, 32, 34, and 36 which are provided with resistors 38, 50, 54, and 58, respectively, in one embodiment. For each lead, either of the two resistors connected to it can be attached at component insertion when the microprocessor card 10 is being manufactured, but not both. When the resistor 38 is connected to the voltage 40 and the resistors 48, 52, and 58 are connected to ground 46, the voltages on leads 30, 32, 34, and 36 would be 1000 in binary notation reading from top to bottom; i.e. one volt, zero volt, zero volt, and zero volt.

Figure 4:
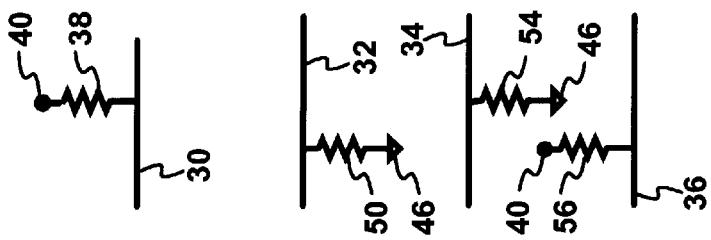
FIG. 4 is another pullup/pulldown resistor arrangement of the present invention.

Referring now to FIG. 4, therein are shown the leads 30, 32, 34, and 36 which are provided with resistors 38, 50, 54, and 56, respectively, in another embodiment. When the resistors 38 and 56 are connected to the voltage 40 and the resistors 48 and 52 are connected to ground 46, the voltages on leads 30, 32, 34, and 36 would be 1001 in binary notation which would form the binary notation signature for the specific microprocessor chip 14.

It should be understood that FIGS. 3 and 4 show only two of the 16 possible combinations of resistors which, when appropriate static voltages are applied, can essentially impose a binary notation signature on the on leads 30, 32, 34, and 36. It should be understood that more leads would provide more combinations than 16 and less would provide fewer combinations. The number of leads depends upon the desired number of features, functions, or speed variations desired.

In the manufacturing, the microprocessor card 10 will be populated with a particular resistor pattern to represent the binary notation signature that represents the operating speed of the CPU 16 which the microprocessor card 10 will carry. For example, a 400 MHz microprocessor could be 1000 as shown in FIG. 3 and a 1 GHz microprocessor could be 1001 as shown in FIG. 4. Although the binary notation signature could be arbitrary, one approach would be to have the slowest CPU 16 start with 0000, the next faster CPU 16 would be 0001, etc.

The microprocessor chip 14 on the microprocessor card 10 will have some of surface area devoted to the series of latches 18, 20, 22 and 24. All these latches will provide inputs from leads 30, 32, 34 and 36 to the multiplier circuitry 26 so as to cause the clocked signal on the microprocessor clock bus 70 to be multiplied by different factors depending on the binary notation signature from the motherboard 12.

Similarly, the north bridge chip 74 on the motherboard 12 will have some of its surface area devoted to the series of latches 104, 106, 108, and 110. All these latches will provide inputs from leads 88, 90, 92, and 94 to the logic and lookup table circuitry 78. The logic and lookup table 78 is capable of causing the drivers 82, 84, 86, or 88 to override the original binary notation signature on the leads as will later be explained.

In operation, when the computer system is powered up, the voltage 40 and the ground 46 will be connected to the microprocessor card 19 resetting the latches and providing the binary notation signature indicative of the operating speed of the microprocessor chip 14. This is exemplified in FIG. 3 and FIG. 4. This operating speed will be known from the voltages due to the resistor pattern on the microprocessor card 10 as the voltages appear at edge connectors 60, 62, 64, and 66.

As an example for ease of explanation, where the speed of the CPU 16 is twice the speed of the motherboard 12, the microprocessor card 10 will be populated by resistors such that the multiplier circuitry 26 on the microprocessor chip 14 will multiply the speed of the motherboard 12 by 2. For example, 0001 could represent a 200 MHz CPU 16. This binary notation signature would be passed through and latched by the latches 104, 106, 108, and 110 to the logic and lookup table circuitry 78. Assuming the basic speed of the clock 68 on the motherboard 12 is 100 MHz as sensed by the logic and lookup table circuitry 78 via lead 103, several things happen. The 0001 would be outputted to the leads 88, 90, 92, and 94, and the latches 18, 20, 22, and 24 would be reset. This would leave the voltages on leads 30, 32, 34, and 36 at 0001. The binary notation signature from the motherboard 12 through the latches 18, 20, 22, and 24 would be latched to cause the multiplier circuitry 26 to multiply the clock signal from the clock 68 by 2. This would mean that the 100 MHz clock signal to the microprocessor chip 14 will be outputted by the multiplier circuitry 26 at 200 MHz to the CPU 16.

When the microprocessor chip 14 is upgraded so the speed of the upgraded CPU 16 is twice the previous speed or 400 MHz, the microprocessor card 10 will be populated by resistors such that the multiplier circuitry 26 will multiply the speed of the 100 MHz motherboard 12 by 4. For example, 0010 could represent a 400 MHz CPU 16. This binary notation signature would be passed through the latches 104, 106, 108, and 110 to the logic and lookup table circuitry 78. Since the basic speed of the clock 68 on the motherboard 12 as sensed by the logic and lookup table circuitry 78 via lead 103 is 100 MHz and the 0010 would remain latched, the lookup table will be used to find the binary notation signature which will correlate the CPU and clock speeds. In the present example, the correlation would indicate a binary notation signature of 0101. This would be outputted through the drivers 80, 82, 84, and 86 which would override the 0010 to leave 0001 on leads 30, 32, 34, and 36. The binary notation signature 0101 through the latches 18, 20, 22, and 24 would cause the multiplier circuitry 26 to multiply the clock signal from the clock 68 by 4 on the microprocessor clock bus 70. This would mean that the 100 MHz clock signal to the microprocessor chip 14 will be outputted by the multiplier circuitry 26 at 400 MHz to the CPU 16.

Similarly, where the speed of the upgrade CPU 16 is a different multiple of the speed of the motherboard 12, multiplier circuitry 26 on the microprocessor chip 14 will multiply the speed of the motherboard 12 clock 68 by the necessary multiple.

When the entire motherboard 12 is upgraded, the clock 68 would be running at a different speed. This different speed in past systems would be problematic if the microprocessor card 10 were not also upgraded. This is because the multiplier circuitry in the microprocessor chip would be set at a particular multiple and upgrading the motherboard would cause a new, faster base clock speed to be multiplied by the particular multiple. For example, a 400 MHz clock signal to a 400 MHz maximum speed CPU for a 100 MHz clock motherboard would be changed to 800 MHz to the CPU with a 200 MHz clock motherboard, which would quickly burn out the CPU. However, with the present invention, there would be no problem.

When the motherboard 12 is upgraded so the speed of the upgraded clock 68 is faster than the previous speed, there will be feedback from the motherboard 12 to the microprocessor card 10 adjusting for the speed change. For example, 0010 could again represent the 400 MHz CPU 16 and the speed of the upgraded motherboard 12 could be 200 MHz. The binary notation signature 0010 would be passed through the latches 104, 106, 108, and 110 and latched into the logic and lookup table circuitry 78. If the basic speed of the clock 68 on the upgraded motherboard 12 as sensed by the logic and lookup table circuitry 78 via lead 103 is 200 MHz, the information in the logic and lookup table circuitry 78 could provide the binary notation signature as 0100. This binary notation signature identifies the correlation between the motherboard 12 and the CPU 16 speeds to essentially identify the motherboard speed to the microprocessor. The 0100 identifying the motherboard 12 relative to the CPU 16 is sent through the drivers 80, 82, 84, and 86 to override the 0010 on connectors 96, 98, 100, and 102. The override binary notation signature 0100 which would be latched by the latches 18, 20, 22, and 24 would cause the multiplier circuitry 26 to multiply the clock signal from the clock 68 by 2. This would mean that the 200 MHz clock signal to the microprocessor chip 14 will be outputted by the multiplier circuitry 26 at the appropriate 400 MHz to the CPU 16.

Thus, both upgrades in the motherboard 12 as well as in the microprocessor card 10 are now possible as is leaving one or the other unchanged.

It should be understood that the microprocessor card 10 could be any type of computing unit including a single chip microprocessor and that the motherboard 12 could be any type of computer support system including a single chip peripheral system. Similarly, the multiplier circuitry 26 could be any type of signal adjustment circuit including a divider or system adjustment mechanism. For example, the adjustment mechanism could be an enabler for various functions embedded in the microprocessor chip 14 which are not accessible until the motherboard 12 is upgraded to allow use of the functions. Such functions, without being limiting, could be any of the conventional upgrade functions described in the Background Art as well as new multimedia functions including improved graphics or sound, or provisions for connecting to other microprocessors for parallel computing, etc.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims. All matters set forth herein or shown in the accompanying drawings are to be interpreted in an illustrative and non-limiting sense.

The invention claimed is:

1. A computing unit connectable to a changeable computer support system which is responsive to a predetermined computing unit identification signal to provide a predetermined computer support system identification signal, comprising:

a central processing unit;

connector means for connecting to the changeable computing support system;

identification means connected to said central processing unit and said connector means, said identification means for providing the predetermined computing unit identification signal identifying said central processing unit to the changeable computer support system when connected thereto; and adjustment means connected to and for providing signals among said central processing unit, said connector means, and said identification means; said adjustment means responsive to the predetermined computer support system identification signal to adjust said signals to said central processing unit from the changeable computer support system.

2. The computing unit as claimed in claim 1 including a clock for providing clock signals and wherein:

said central processing unit requires said clock signals; and said adjustment means is connectable to said clock and to adjust said clock signals therefrom to said central processing unit.

3. The computing unit as claimed in claim 1 wherein said identification means includes means for providing the predetermined computing unit identification signal as a binary notation signature.

4. The computing unit as claimed in claim 1 wherein said identification means includes a plurality of resistors connected to said connector means and having potentials imposed thereon from said changeable computer support system to provide the predetermined computing unit identification signal as a binary notation signature.

5. The computing unit as claimed in claim 1 wherein said identification means includes a plurality of latches connected to said connector means for latching the predetermined computer support system identification signal from the changeable computer support system to said adjustment means.

6. The computing unit as claimed in claim 1 including a clock for providing clock signals and wherein central processing unit requires said clock signals and said adjustment means is multiplier circuitry responsive to said predetermined computer support system identification signal to multiply said clock signals to said central processing unit.

7. A computer support system connectable with a changeable computing unit for providing a predetermined computer unit identification signal and responding to a predetermined computer support system identification signal, comprising:

connector means for connecting to the changeable computing unit;

identification means connected to said connector means, said identification means capable of receiving the predetermined computer unit identification signal;

logic and lookup means connected to said identification means responsive to the predetermined computer unit identification signal for looking up the predetermined computer support system identification signal corresponding thereto and providing the predetermined computer support system identification signal to said identification means; and said identification means includes means connected to said logic and lookup means and to said connector means for providing the predetermined computer support system identification signal identifying said computer support system to the changeable computing unit when connected thereto.

8. The computer support system as claimed in claim 7 including a clock for providing clock signals and wherein said computer support system requires said clock signals.

9. The computer support system as claimed in claim 7 wherein said identification means includes means for providing the predetermined computer support system identification signal as a binary notation signature.

10. The computer support system as claimed in claim 7 wherein said means for providing the predetermined computer support system identification signal includes drivers connected to said connector means to override said predetermined computing unit identification signal thereon.

11. The computer support system as claimed in claim 7 wherein said identification means includes a plurality of latches for latching the predetermined computing unit identification signal to said logic and lookup means.

12. A computer unit and computing support system comprising:

a central processing unit in the computer unit;

connector means for connecting the computer unit to the computer support system;

first identification means connected to said central processing unit and said connector means, said first identification means for providing a predetermined computing unit identification signal identifying said central processing unit to the computer support system;

second identification means connected to said connector means, said second identification means for receiving the predetermined computer unit identification signal;

logic and lookup means connected to said second identification means responsive to said predetermined computer unit identification signal for looking up a predetermined computer support system identification signal corresponding thereto and providing said predetermined computer support system identification signal to said second identification means; and said second identification means includes means connected to said logic and lookup means and to said connector means for providing the predetermined computer support system identification signal identifying said computer support system to the computing unit; and adjustment means connected to and for providing signals among said central processing unit, said connector means, and said first and second identification means; said adjustment means responsive to said predetermined computer support system identification signal to adjust said signals to said central processing unit from said computer support system.

13. The computing unit and computer support system as claimed in claim 12 including a clock for providing clock signals and wherein;

said central processing unit requires said clock signals; and said adjustment means is connected to said clock and adjusts said clock signals therefrom to said central processing unit.

14. The computing unit and computer support system as claimed in claim 12 wherein said first identification means includes means for providing said predetermined computing unit identification signal as a binary notation signature.

15. The computing unit and computer support system as claimed in claim 12 wherein said first identification means includes a plurality of resistors connected to said connector means and having potentials imposed thereon from said computer support system to provide the predetermined computing unit identification signal as a binary notation signature.

16. The computing unit and computer support system as claimed in claim 12 wherein said first identification means includes a plurality of latches for latching said predetermined computer support system identification signal to said adjustment means.

17. The computing unit and computer support system as claimed in claim 12 including a clock for providing clock signals and wherein said central processing unit requires said clock signals and said adjustment means is multiplier circuitry for said clock signals from said clock to said central processing unit.

18. The computing unit and computer support system as claimed in claim 12 including a clock for providing clock signals and wherein said computer support system requires said clock signals.

19. The computing unit and computer support system as claimed in claim 12 wherein said second identification means provides said predetermined computer support system identification signal as a binary notation signature.

20. The computing unit and computer support system as claimed in claim 12 means for providing said predetermined computer support system identification signal includes drivers connectable to said connector means to override said predetermined computing unit identification signal thereon.

* * * * *